US 8,712,713 B2

(12) United States Patent
Wolf

(10) Patent No.: US 8,712,713 B2
(45) Date of Patent: Apr. 29, 2014

(54) METHOD AND APPARATUS FOR DETERMINING THE ALTITUDE OF A MOBILE DEVICE

(75) Inventor: Thomas G Wolf, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1551 days.

(21) Appl. No.: 11/687,521

(22) Filed: Mar. 16, 2007

(65) Prior Publication Data

US 2007/0218823 A1 Sep. 20, 2007

Related U.S. Application Data

(60) Provisional application No. 60/784,609, filed on Mar. 20, 2006.

(51) Int. Cl.

| G01C 5/06 | (2006.01) |
|---|---|
| G01B 21/02 | (2006.01) |
| G01C 25/00 | (2006.01) |
| G01D 18/00 | (2006.01) |
| G06F 17/40 | (2006.01) |
| G06F 19/00 | (2011.01) |

(52) U.S. Cl.
CPC ...... *G01C 5/06* (2013.01); *G01B 21/02* (2013.01); *G01C 25/00* (2013.01); *G01D 18/008* (2013.01); *G06F 17/40* (2013.01); *G06F 19/00* (2013.01)
USPC .............. 702/97; 73/1.81; 702/85; 702/104; 702/166; 702/187; 702/189; 708/200

(58) Field of Classification Search
CPC ............ G01B 7/00; G01B 7/02; G01B 7/023; G01B 11/00; G01B 11/02; G01B 21/00; G01B 21/02; G01C 5/00; G01C 5/06; G01C 25/00; G01D 3/00; G01D 3/08; G01D 18/00; G01D 18/002; G01D 18/008; G06F 11/00; G06F 11/30; G06F 11/32; G06F 17/00; G06F 17/40; G06F 19/00

USPC .......... 702/150, 1, 85, 88, 97, 104, 127, 130, 702/138, 142, 155, 158, 166, 187, 189; 73/1.01, 1.79, 1.81, 384, 432.1, 700, 73/865.8; 340/500, 540; 342/118, 120; 701/1, 3, 4; 708/100, 105, 200

IPC ............... G01B 7/00,7/02, 7/023, 11/00, 11/02, G01B 21/00, 21/02; G01C 5/00, 5/06, 25/00; G01D 3/00, 3/08, 18/00, 18/002, 18/008; G06F 11/00, 11/30, 11/32, 17/00, 17/40, 19/00

See application file for complete search history.

(56) References Cited

U.S. PATENT DOCUMENTS

| 2,691,305 | A | * | 10/1954 | Frank | 73/386 |
| 2,731,831 | A | * | 1/1956 | Schaefer | 73/387 |
| 3,264,876 | A | * | 8/1966 | Ten Bosch et al. | 73/386 |
| 3,621,718 | A | * | 11/1971 | Ireland | 73/708 |
| 4,253,335 | A | * | 3/1981 | Shimomura | 73/384 |
| 4,263,804 | A | * | 4/1981 | Seemann | 73/30.01 |
| 4,319,487 | A | * | 3/1982 | Haase et al. | 73/384 |
| 5,001,929 | A | | 3/1991 | Peet, II | |
| 6,216,064 | B1 | * | 4/2001 | Johnson et al. | 701/4 |
| 6,266,583 | B1 | | 7/2001 | Tazartes et al. | |
| 6,640,165 | B1 | * | 10/2003 | Hayward et al. | 701/4 |
| 2007/0168124 | A1 | * | 7/2007 | Dossas et al. | 701/213 |

FOREIGN PATENT DOCUMENTS

| CN | 1427244 | | 7/2003 |
| EP | 0733879 | | 9/1996 |
| EP | 1132711 | A1 * | 9/2001 |
| EP | 1312891 | A2 | 5/2003 |
| JP | 08285582 | | 1/1996 |
| JP | 08261755 | | 11/1996 |
| JP | 2000131061 | A | 5/2000 |
| JP | 2001289632 | | 10/2001 |
| JP | 2002267443 | A | 9/2002 |
| JP | 2003156329 | A | 5/2003 |
| RU | 2018867 | | 8/1994 |
| RU | 2128849 | | 4/1999 |
| RU | 2179710 | | 2/2002 |
| WO | WO9102944 | | 3/1991 |

OTHER PUBLICATIONS

International Search Report and Written Opinion—PCT/US2007/064312, International Search Authority—European Patent Office—Sep. 19, 2007.

Translation of Decision to Grant for Russian Application 2008141278 corresponding to U.S. Appl. No. 11/687,521, citing US5001929, EP1312891, US6266583, RU2179710, RU2018867 and RU2128849. Dated Jun. 7, 2010.

Translation of Office Action in Chinese application 200780005006.6, corresponding to U.S. Appl. No. 11/687,521, citing CN1427244 and US6266583. Dated Nov. 8, 2009.

Translation of Office Action in Korean application 2008-7022386, corresponding to U.S. Appl. No. 11/687,521, citing JP2001-289632 and US6266583. Dated Aug. 6, 2010.

\* cited by examiner

*Primary Examiner* — Edward Cosimano

(74) *Attorney, Agent, or Firm* — Jennifer M. Pascua

(57) ABSTRACT

A method and apparatus for combining pressure information from pressure sensors, motion information from dead reckoning or other motion sensors, such as accelerometers, gyroscopes, and geomagnetic sensors, and temperature information from temperature sensors, to separate a change in altitude from a change in environmental pressure or temperature. A change in measured pressure without any motion or change in temperature must be a weather-related barometric pressure change. If there is an associated temperature change, but no motion, and the rate of change is too fast for a normal weather change, the measured change represents a change in sensitivity of the pressure sensor with temperature, and the sensor calibration can be adjusted. A rapid change in pressure, associated with horizontal motion, but no measurable vertical motion represents a movement into a different pressure environment. Only changes in pressure that are associated with measurable vertical motion are true changes in altitude.

22 Claims, 2 Drawing Sheets

METHOD AND APPARATUS FOR DETERMINING THE ALTITUDE OF A MOBILE DEVICE

CLAIM OF PRIORITY UNDER 35 U.S.C. §119

The present Application for Patent claims priority to Provisional Application No. 60/784,609 entitled, "Improved Altitude Determination in Mobile Devices," filed Mar. 20, 2006, which was assigned to the assignee hereof and hereby expressly incorporated by reference herein.

BACKGROUND

1. Field

The present invention relates to mobile devices and more particularly to a method and apparatus for accurately determining the altitude of a mobile device.

2. Background

Position determination is an important and growing feature of cellular telephones and other handheld mobile devices. The most prevalent approach to determining location is to embed Global Positioning System (GPS) navigation receiver capability into the mobile device. However, GPS-based positioning has limitations. GPS systems cannot resolve altitude accurately. In some larger and more complex devices, the GPS systems have been augmented with barometric pressure based altimeters. This provides a significant improvement in altitude accuracy. However, a barometric altimeter responds to changes in pressure as well as changes in altitude. The altimeter can be fooled when a person enters or leaves climate-controlled rooms and buildings, or experiences other changes in environmental pressure. The present invention minimizes the effects of environmental pressure changes on the determination of altitude.

The ability to determine the location of a mobile device such as a cellular telephone is desirable for emergency calls, and for a variety of commercial purposes generally called Location Based Services. GPS-based position determination is based upon determining the distance that the signal travels from the GPS satellites, so it is not very accurate in indoor environments and other locations, where satellite signals can be blocked, distorted or reflected. In addition, because the satellites are usually high in the sky, the GPS-based position is less accurate in altitude, than in the horizontal position. This is why pressure-based altimeters have been added to more complex GPS systems in the past. However, the addition of altimeters has not been implemented in low-cost consumer mobile devices because of the cost and size. There are several other limitations to using these prior art solutions.

Local atmospheric pressure can change for three reasons—change in true atmospheric pressure (weather-related barometric pressure changes), changes in the environment (going into a building where the ventilating system maintains a higher or lower pressure), and changes in altitude. Separating these other effects to determine true changes in altitude is difficult. Additionally, the sensitivity of low cost atmospheric pressure sensors varies with their temperature, so changes in temperature can be misinterpreted as changes in altitude.

A solution to these problems is needed that would enable the use of atmospheric pressure sensors in mobile devices.

SUMMARY

The present method and apparatus minimizes the effects of environmental pressure changes and temperature changes on the determination of altitude. Others have not solved this problem and consider it a limitation of pressure-based altimeters. The method and apparatus herein consists of combining the pressure information with information from dead reckoning sensors, such as accelerometers, gyroscopes, and geomagnetic sensors, and information from temperature sensors to separate what constitutes a change in altitude from a change in environmental pressure or temperature.

The simplest implementation consists of using the motion sensors to establish whether the device is at rest. If at rest, any changes in measured pressure must be environmental, not altitude, and therefore should be used to recalibrate the altimeter. This allows the system to automatically minimize barometric pressure (weather) and temperature changes on altitude measurements. A more sophisticated implementation includes algorithms that interpret a rapid pressure change without associated vertical motion as a movement from one environment to another (entering a pressurized building for example), and recalibrates the altimeter for the pressure change. Similarly, when vertical acceleration is detected, the rate of vertical acceleration can be compared to the rate of pressure change, and appropriate adjustments can be made to the reported altitude.

An object of the present invention is to accurately determine the altitude of a mobile device taking into consideration environmental changes.

An advantage of the present invention is that it is a simple and inexpensive method of determining what type of environmental change is occurring and separating it from actual altitude changes. The invention improves the effectiveness of a low cost pressure sensor used as an altitude sensor Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION

Figure 1:
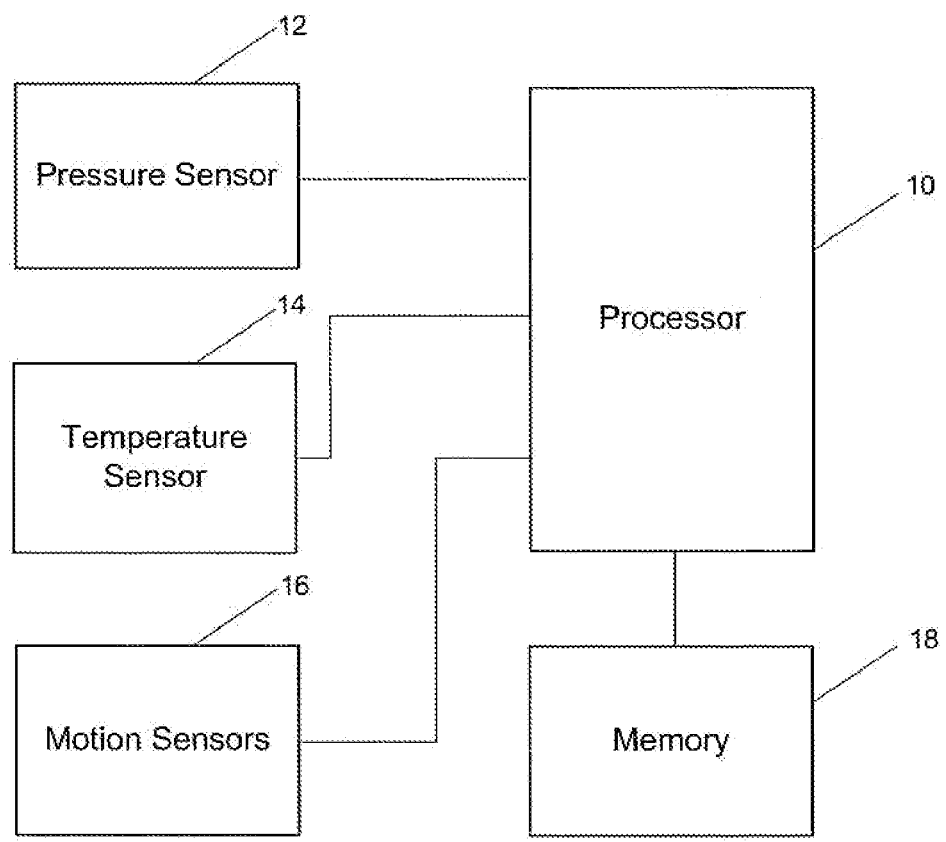
FIG. 1 is a block diagram depicting the components for the preferred embodiment.

As used herein, "mobile device" refers to a device such as a cellular telephone, other wireless communication device, laptop computer, or other mobile positioning device.

At any given location, atmospheric pressure typically varies by up to 2% depending upon weather conditions (low pressure systems vs. high pressure systems). Local atmospheric pressure also varies in an exponential manner with altitude. Near the earth's surface the scale height $h_0$ is about 9 km. For a height, h, above a reference location, the pressure is given by:

$$p = p_0 \times e^{-h/h_0}$$

Where $p_0$ is the atmospheric pressure at the reference location. If the atmospheric pressure were constant, a pressure sensor could be used to determine changes in altitude precisely. Since other factors influence pressure, this cannot be applied directly. For example, the weather-related variations in pressure of ±2% are equivalent to a change in altitude of ±182 m. Clearly a pressure sensor alone cannot be used to resolve altitude to a resolution of 1 m, as would be desired in identifying, for example, which floor of a building a person with a mobile device is on.

To further complicate matters, buildings or rooms within buildings can be maintained at slight negative or positive pressure relative to the outside or to other rooms, in order to manage the flow of contaminants, or to manage heating and cooling. For example, a room that is slightly positive in pressure will always have air flowing out of it, if there is an opening or leak. This would prevent outside dust from getting in through the opening. This technique is commonly used in clean rooms used in manufacturing. Conversely, a containment room, such as where hazardous fumes or biological hazards are used is usually maintained at a slightly lower pressure than its surroundings, so that even if a leak occurs, air flows inward, keeping the hazard contained in the room. Beyond these specialized applications, pressure differences are used within buildings to maintain the flow of heated or cooled air in a planned direction to optimize temperature control in the building. Elevated pressure in a building is also used to keep dust, smog, or cold air from entering a building when doors are opened. These deliberate pressure differences are typically about 0.05% of standard atmospheric pressure, which is equivalent to changes in altitude of 4.4 m. This is much smaller than the weather-related changes, but still significant, compared to the 3 m height of a typical floor of a building.

In low cost pressure sensors, the scale factor (volts/atmosphere) can also vary by up to 1% as the temperature of the sensor changes. This can add an additional equivalent height variation of 90 m. Therefore, without compensation for these factors, it is not possible to use a pressure sensor to measure altitude with resolutions approaching 1 m.

Using pressure sensors as altimeters dates back to at least the early days of aviation, but the technique has always relied upon knowing what the current atmospheric pressure at ground level was and then manually compensating for the difference between the measured pressure at ground level, and the standard pressure. Other altimeters, such as those used by hikers, rely upon the user setting the altitude back to the correct value whenever he is at a known location. This temporarily compensates for the weather-induced changes in the local pressure. These altimeters typically claim accuracies around 30-100 m, and are used outdoors, so the extraneous effects from temperature and environmental pressure are not significant. No products currently exist that are designed to resolve altitude indoors, and to the resolution of less than 3 m, so the issue of indoor pressures has not been addressed.

The present invention provides a method for recognizing these various sources for change in the reading from a pressure sensor and isolating those changes that truly correspond to a change in altitude. Information from other sensors is used to isolate the source of the change in measured pressure, as shown in FIG. 1. FIG. 1 shows a typical system contained in a mobile device. The components of a typical system consist of a processor 10 for gathering and manipulating the data from the various sensors. Processor 10 can be a dedicated processor or a shared processor; both of these are well known in the art. The sensors include one or more pressure sensors 12, one or more temperature sensors 14 and one or more motion sensors 16. Additionally, a memory component 18 is required to store the sensor data to determine the changes of the predetermined environment over a period of time. Again this component can be a dedicated or shared component.

Figure 2:
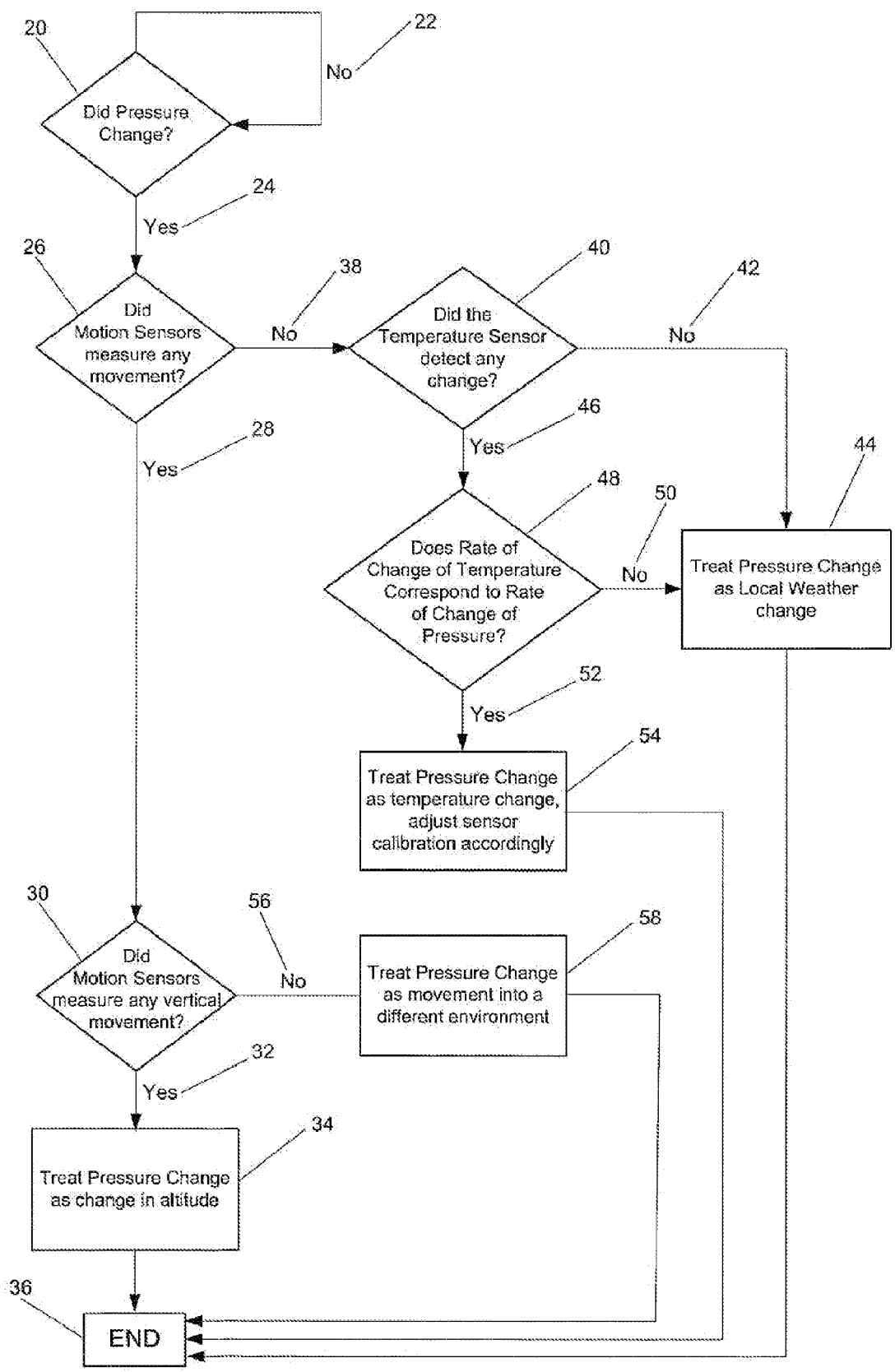
FIG. 2 is a flow chart showing the steps involved for determining the actual change in altitude of a typical portable device.

FIG. 2 is a flow chart showing the logic that enters into the determination of the actual altitude change. As used herein the phrase "actual altitude" refers to a more accurate measure of altitude than that gained from a preliminary measurement by one or more pressure sensors. The first step of the process is to determine whether a change in pressure is measured 20. If the pressure did not change 22, the system default determines that the altitude has not changed and the process repeats until a change in pressure is detected. If a pressure change is detected 24, a determination is made whether the motion sensors measured movement 26 of the mobile device. If the motion sensors detect movement 28, the next step is to determine whether the movement is in a vertical direction 30. If the movement contains a vertical component 32, the pressure change is treated as an altitude change 34 and the process ends 36. If the motion sensors do not detect any vertical movement 56, the pressure change is deemed to be a movement to a different environment 58 and the process ends 36 without changing the altitude.

If the motion sensors do not detect movement 38, the processor determines whether a change in temperature is detected by the temperature sensor 40. If there is no temperature change 42, the pressure change 24 is deemed to be a change in weather conditions 44 and the process ends 36. Since a temperature change in itself is not determinative, an additional safeguard is provided. If there is a temperature change 46, a determination is made whether the rate of change of the temperature corresponds to the rate of change of pressure 48. If these rates of change do not correspond 50, the pressure change 24 is deemed to be a change in weather conditions 44 and the process ends 36. For example, if the pressure sensor's reading is known to change by 0.1% per degree of temperature change, and the temperature sensor reports a change in temperature of 10° over 10 minutes, then the pressure reading should change by about 1% over 10 minutes due to the temperature change. If the rate of change of pressure does not approximately equal the rate of change that the temperature change should induce, the pressure change is due to something other than temperature.

If the rate of change of the temperature corresponds to the rate of change in pressure 52, the pressure change is treated as temperature change and the sensors are calibrated accordingly 54 and the process ends 36.

The algorithm can be further refined by incorporating additional rate of change information. For example, weather changes are typically quite slow, exhibiting a gradual change over a period of hours, and then stabilizing at a new value. Passing through a door into a building or a pressurized room will occur in a matter of seconds, so the pressure vs. time profile would consist of two different constant values, with an abrupt transition between them in a matter of seconds. Similarly, an accelerometer that measured motion in the vertical direction would exhibit a particular acceleration vs. time profile. This would be different for a person ascending stairs, riding an escalator or an elevator, or driving up into the mountains. But in every case, the altitude derived from the pressure should exhibit a corresponding profile with time.

The better they correspond, the more accurate one would expect the pressure-derived altitude to be. The present invention can also be used for altimeters that have temperature compensation built in, thus obviating the need for a temperature sensor. The motion sensors can still be used to refine pressure based-altitude measurements.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, such as a memory of a mobile device, and executed by a processor or microprocessor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Although GPS navigation system is referenced throughout, positioning capability is not limited to this particular methodology. A mobile device may receive signals from navigation system satellites from Galileo (to be implemented in the future), GLONASS, NAVSTAR, GNSS, a system that uses satellites from a combination of these systems, or any future satellite positioning system ("SPS"), for use in determining position location. As used herein, an SPS will also be understood to include pseudolite systems. Assisted GPS techniques are also commonly used to determine mobile device position. Further, satellite positioning systems may be used alone or in combination with terrestrial positioning systems and methodologies.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method comprising:
    directly detecting a change in pressure, a change in temperature, and movement by at least one environmental sensor of a mobile device;
    determining whether a preliminary altitude measured by an altimeter is indicative of a change of an actual altitude of the mobile device or a detected environmental change based at least in part on the detected change in the pressure and a determination of whether the detected movement comprises a vertical movement component; and
    adjusting a calibration of the at least one environmental sensor at least partially in response to the change in the pressure and the change in the temperature, and further in response to an absence of the vertical movement component.

2. The method of claim 1 further comprising storing sensor data from the at least one environmental sensor and the altimeter and determining a change in the sensor data over a predetermined period of time.

3. The method of claim 2 wherein the determining a change in the sensor data over a predetermined period of time comprises determining whether a rate of change of the pressure is caused by a rate of change in the temperature.

4. The method of claim 2 wherein the determining a change in the sensor data over a predetermined period of time comprises determining whether a rate of change of pressure is caused by a measured vertical movement.

5. The method of claim 2 further comprising storing predetermined sensor data profiles.

6. A mobile device comprising:
    at least one environmental sensor disposed on the mobile device to directly detect a change in pressure and movement;
    a processor to:
        determine whether a preliminary altitude measured by an altimeter is indicative of a change of an actual altitude of the mobile device based at least in part on the detected change in the pressure and a determination of whether the detected movement comprises a vertical movement component, and
        adjust a calibration of the altimeter at least partially in response to the change in the pressure and a change in temperature, and further in response to an absence of the vertical movement component.

7. The mobile device of claim 6 wherein the at least one environmental sensor comprises at least one motion sensor.

8. The mobile device of claim 6 wherein the at least one environmental sensor comprises at least one sensor type selected from the group consisting of: an accelerometer, a gyroscope, or a geomagnetic sensor.

9. The mobile device of claim 6 further comprising a memory for storing altimeter data and sensor data.

10. A method comprising:
    detecting a change in pressure, by a pressure sensor;
    detecting a change in movement, by a motion sensor;
    detecting a change in temperature, by a temperature sensor;
    determining whether a preliminary altitude detected by an altimeter is indicative of an change of an actual altitude or a detected environmental change based at least in part on the detected change in the pressure and a determination of whether the detected change in movement comprises a vertical movement component; and
    adjusting a calibration of the temperature sensor at least partially in response to the change in the pressure and the change in the temperature, and further in response to an absence of the vertical movement component.

11. The method of claim 10 wherein the detecting a change in movement comprises measuring the vertical movement component.

12. The method of claim 10 further comprising comparing the detected change in pressure, detected change in movement or detected change in temperature with stored profiles.

13. The method of claim 10 further comprising storing data from the motion sensor, the temperature sensor and the pressure sensor and determining a change in sensor data over a predetermined period of time.

14. The method of claim 13 wherein determining a change in the sensor data over a predetermined period of time comprises determining whether a rate of change of pressure is caused by a temperature change.

15. The method of claim 13 wherein determining a change in the sensor data over a predetermined period of time comprises determining whether a rate of change of pressure is caused by a measured vertical movement.

16. A device comprising:
a non-transitory computer readable medium comprising instructions executable by a processor to:
initiate measurement of a preliminary altitude of a mobile device, by an altimeter;
determine whether the preliminary altitude measured by the altimeter is indicative of a change of an actual altitude of the mobile device or a detected environmental change based at least in part on a detected change in pressure and a determination of whether detected movement comprises a vertical movement component, wherein the detected change in pressure and the detected change in movement are determined by at least one environmental sensor of the mobile device; and
adjust a calibration of the at least one environmental sensor at least partially in response to the change in the pressure and the change in the temperature, and further in response to an absence of the vertical movement component.

17. A device comprising:
a non-transitory computer readable medium comprising instructions executable by a processor to:
initiate measurement of a preliminary altitude of a mobile device, by an altimeter;
detect a change in pressure indicated at least partially by a pressure sensor;
detect a change in movement indicated at least partially by a motion sensor;
detect a change in temperature indicated at least partially by a temperature sensor;
determine whether the preliminary altitude determined by the altimeter is indicative of a change of an actual altitude of the mobile device or a detected environmental change based at least in part on the detected change in the pressure and in the temperature, and a determination of whether the detected change in movement comprises a vertical movement component; and
adjust a calibration of the temperature sensor at least partially in response to the change in the pressure and the change in the temperature, and further in response to an absence of the vertical movement component.

18. A mobile device comprising:
means for directly detecting a change in pressure and movement by at least one environmental sensor of the mobile device;
means for determining whether a preliminary altitude measured by an altimeter is indicative of a change of an actual altitude of the mobile device or a detected environmental change based at least in part on the detected change in the pressure and a determination of whether the detected movement comprises a vertical movement component; and
means for adjusting a calibration of the at least one environmental sensor at least partially in response to the change in the pressure and the change in temperature, and further in response to an absence of the vertical movement component.

19. The mobile device of claim 18 further comprising means for measuring a temperature of the mobile device.

20. The mobile device of claim 18 wherein the means for determining a change in the sensor data over a predetermined period of time comprises means for determining whether a rate of change of pressure is caused by a measured vertical movement.

21. The mobile device of claim 18 further comprising means for storing sensor data from the at least one environmental sensor and the altimeter and means for determining a change in the sensor data over a predetermined period of time.

22. The mobile device of claim 21 wherein the means for determining a change in the sensor data over a predetermined period of time comprises means for determining whether a rate of change of pressure is caused by a temperature change.

* * * * *